(12) United States Patent
Shim et al.

(10) Patent No.: US 8,493,730 B2
(45) Date of Patent: Jul. 23, 2013

(54) PORTABLE TERMINAL

(75) Inventors: Seon-Hee Shim, Gyeonggi-do (KR);
Sang-Joon Park, Seoul (KR);
Jong-Woo Kim, Gyeonggi-do (KR);
Seok-Gyu Lee, Gyeonggi-do (KR)

(73) Assignee: Samsung Electronics Co., Ltd.,
Samsung-ro, Yeongtong-gu, Suwon-si,
Gyeonggi-do (KR)

( * ) Notice: Subject to any disclaimer, the term of this patent is extended or adjusted under 35 U.S.C. 154(b) by 262 days.

(21) Appl. No.: 12/870,993

(22) Filed: Aug. 30, 2010

(65) Prior Publication Data

US 2011/0063783 A1  Mar. 17, 2011

(30) Foreign Application Priority Data

Sep. 14, 2009  (KR) .................. 10-2009-0086525

(51) Int. Cl.
*G06F 1/16* (2006.01)
*G09G 5/00* (2006.01)
*E05D 7/00* (2006.01)
*E05D 3/06* (2006.01)
*E05D 11/10* (2006.01)
*E05C 17/64* (2006.01)
*H04M 1/00* (2006.01)

(52) U.S. Cl.
USPC ............ 361/679.55; 361/679.56; 361/679.04; 345/1.1; 345/1.3; 16/354; 16/342; 16/366; 16/321; 455/575.1; 455/575.3; 455/575.4

(58) Field of Classification Search
USPC ............ 361/679.01–679.45, 679.55–679.59; 345/1.1, 1.3; 455/575.1, 575.3, 575.4; 16/354, 16/342, 366, 321
See application file for complete search history.

(56) References Cited

U.S. PATENT DOCUMENTS

| | | | | |
|---|---|---|---|---|
| 6,900,981 | B2* | 5/2005 | Kuivas et al. | 361/679.06 |
| 7,052,195 | B2* | 5/2006 | Hsu | 400/472 |
| 7,197,332 | B2* | 3/2007 | Andersson et al. | 455/557 |
| 7,373,186 | B2* | 5/2008 | Watanabe et al. | 455/575.3 |
| 7,414,834 | B2* | 8/2008 | Ukonaho et al. | 361/679.55 |
| 8,205,305 | B2* | 6/2012 | Wang et al. | 16/354 |
| 2005/0122671 | A1* | 6/2005 | Homer | 361/681 |
| 2006/0238440 | A1* | 10/2006 | Kim et al. | 345/1.1 |
| 2007/0226955 | A1* | 10/2007 | Cho et al. | 16/354 |
| 2009/0070961 | A1* | 3/2009 | Chung et al. | 16/354 |

* cited by examiner

*Primary Examiner* — Jayprakash N Gandhi
*Assistant Examiner* — Nidhi Desai
(74) *Attorney, Agent, or Firm* — Cha & Reiter, LLC

(57) ABSTRACT

A portable terminal is provided, in which a hinge device provides a pair of hinge axes extended in parallel, a pair of folding cases are engaged with the hinge device and rotate upon the hinge axes, respectively, and sliding housings are installed in the respective folding cases. The folding cases rotate in a folding direction or in an unfolding direction via the hinge device, and when the folding cases rotate, the sliding housings slide on the folding cases. When the sliding housings are opened at 180° with respect to each other, one end of the sliding housing is in a close relationship with one end of another sliding housing.

13 Claims, 6 Drawing Sheets

PORTABLE TERMINAL

CLAIM OF PRIORITY

This application claims the benefit under 35 U.S.C. §119 (a) of a Korean Patent Application filed in the Korean Intellectual Property Office on Sep. 14, 2009 and assigned Serial No. 10-2009-0086525, the entire disclosure of which is hereby incorporated by reference.

BACKGROUND OF THE INVENTION

1. Field of the Invention

The present invention generally relates to a portable terminal. More particularly, the present invention relates to a folder-type portable terminal for enabling a user to conveniently use multimedia features.

2. Description of the Related Art

In general, a portable terminal is a device that a user carries for a mobile communication service. Beyond the early stage of voice call or short message transmission, mobile communication services have been advanced to provide multimedia services, such as video, game, and interactive broadcasting services. Before these multimedia services are commercialized through portable terminals, portable terminals were manly developed for portability, thus smaller and lighter device were the main target for manufacturers.

However, as the mobile communication services have been expanded to multimedia services, portable terminals designed for the purpose of voice call or short message transmission have limitations in allowing users to enjoy the multimedia services. That is, it is difficult to secure an adequate size of a display in a small hand held portable terminal, and such a display is typically not effective in viewing video or broadcast programs.

Accordingly, many efforts have been focused to allow users to enjoy multimedia services with a reasonable comfort through their portable terminals as well as to miniaturize portable terminals. As a result, the thickness of portable terminals has been significantly reduced, but the portability of portable terminals needs more improvements as a sufficient display size is still not available.

A larger display may be configured in a portable terminal by installing a display and a keypad in a single module using a touch screen, instead of installing a display and a keypad separately. Nonetheless, the portability of portable terminals and the convenience of multimedia services are in a trade-off relationship. There is much difficulty in fabricating portable terminals that is well balanced between portability and multimedia service convenience.

Therefore, portable terminals with an enhanced multimedia service function are typically designed with a bar type terminal having a touch screen. However, the bar-type portable terminal has limitations in its effectiveness to meet a variety of users' demands and preferences regarding the outward appearance of portable terminals.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide a portable terminal configured to be small but to include a display of a sufficient size, thus enabling a user to conveniently enjoy a multimedia service while esthetically pleasing to a user.

Another aspect of exemplary embodiments of the present invention provides a portable terminal for satisfying various tastes and demands of users regarding the outward appearance of the portable terminal.

In accordance with an aspect of exemplary embodiments of the present invention, a portable terminal in which a hinge device provides a pair of hinge axes extended in parallel, a pair of folding cases are engaged with the hinge device and rotate upon one hinge axis of the hinge axes, respectively, and sliding housings are installed in the respective folding cases. The folding cases rotate in a folding direction or in an unfolding direction and interact with each other via the hinge device. When the folding cases rotate, the sliding housings slide on the folding cases. When the sliding housings are opened at 180° with respect to each other, one corner of the sliding housing comes in a close contact with another corner of other sliding housing.

The hinge device may include a cover member including a cover portion for covering one surface of the folding case in a folded state, and module installation portions formed at both ends of the cover portion for covering both side ends of the folding cases, and a hinge module installed on at least one of the module installation portions.

The hinge module may include a pair of first sun gears arranged upon the hinge axes, respectively and a pair of second sun gears arranged between the first sun gears, for making the first sun gears interact with each other. Alternatively, a pair of first sun gears arranged upon the hinge axes, respectively, and a timing belt for enabling the first sun gear to interact with each other. Also, the hinge module may include a pair of first sun gears arranged upon the hinge axes, respectively. The teeth of the first sun gears may be engaged with each other. When one of the first sun gear rotates, the other first sun gear may rotate.

The hinge module may further include an engagement plate for allowing the first sun gears to be rotatably engaged therewith, and a pair of guide grooves formed by partially cutting the engagement plate, and the portable terminal may further include guide protrusions formed at least one ends of the sliding housings. The guide protrusions may be engaged with the guide grooves. When the sliding housings rotate, the guide protrusions may move along an extended direction of the guide grooves.

The hinge module may further include a module groove formed on an inner surface of the module installation portion, and the hinge module may be accommodated in the module groove.

The portable terminal may further include a display installed in each of the sliding housings, and the displays may be kept in contact at the corners of the sliding housings.

The portable terminal may further include keys installed on outer surfaces of the sliding housings. When the folding cases and the sliding housings rotate, the keys may be opened or closed by one of the folding cases.

When the folding cases and the sliding housings are folded, the keys may be opened or exposed for operation. When the folding cases and the sliding housings are unfolded or opened, the keys may be hidden.

Each of the sliding housings may include an engagement portion formed by making a part of the sliding housing lower than the other parts of the sliding housing, and the engagement portions may be accommodated in the folding cases. The keys may be installed on surfaces of the engagement portions.

When the sliding housings are combined with the folding cases, outer surfaces of the sliding housings, except for the engagement portions, may be in an even relation with outer surfaces of the folding cases.

The portable terminal may further include at least one sliding groove formed into the surface of each of the engagement portions, extending along a sliding direction of the sliding housings, and a sliding protrusion formed on an inner surface of each of the folding cases. When the sliding housings are engaged with the folding cases, the sliding protrusions may guide sliding of the sliding housings while engaging with the sliding grooves.

BRIEF DESCRIPTION OF THE DRAWINGS

The above features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
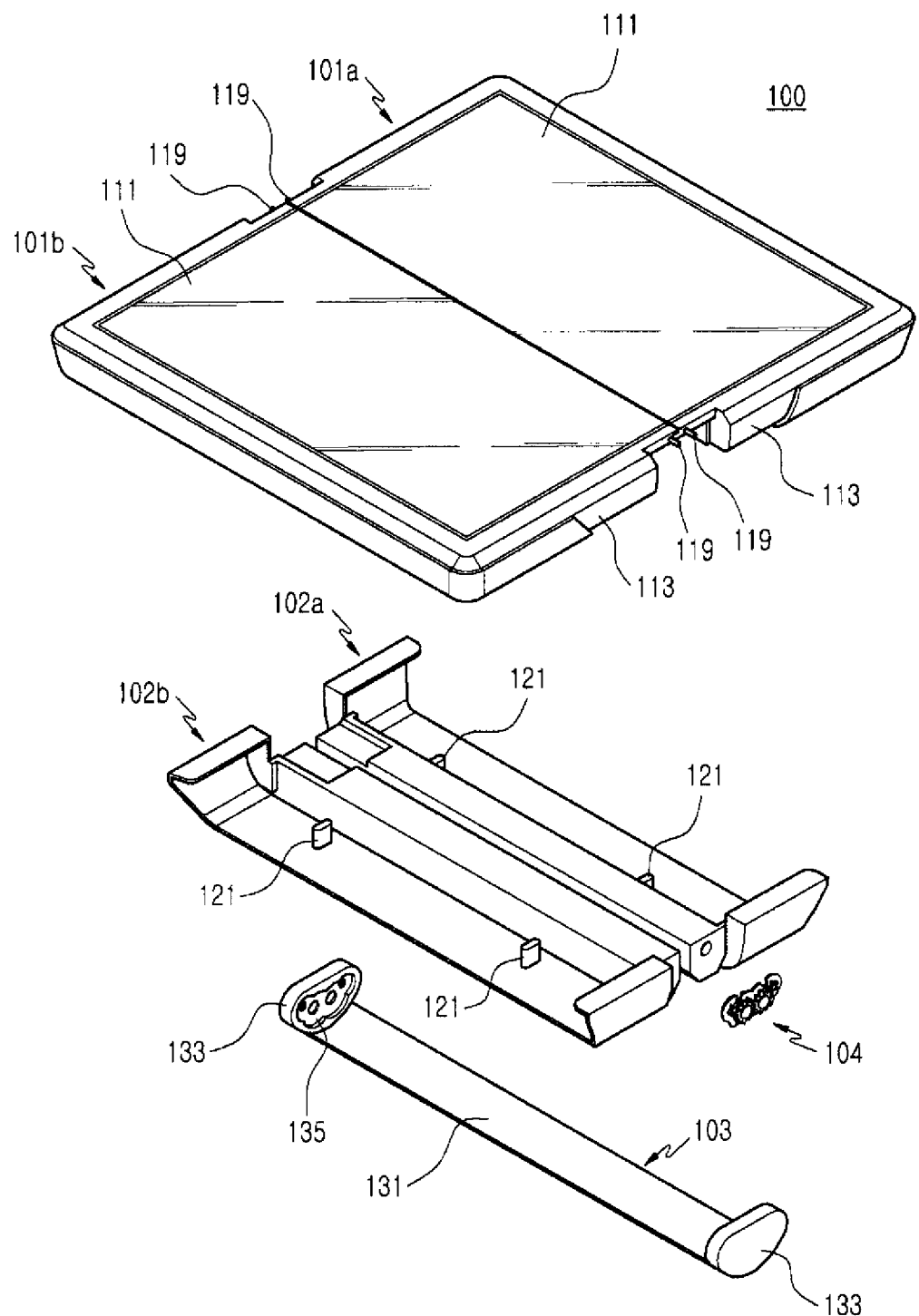
FIG. 1 is an exploded perspective view of a portable terminal according to an exemplary embodiment of the present invention.
Figure 2:
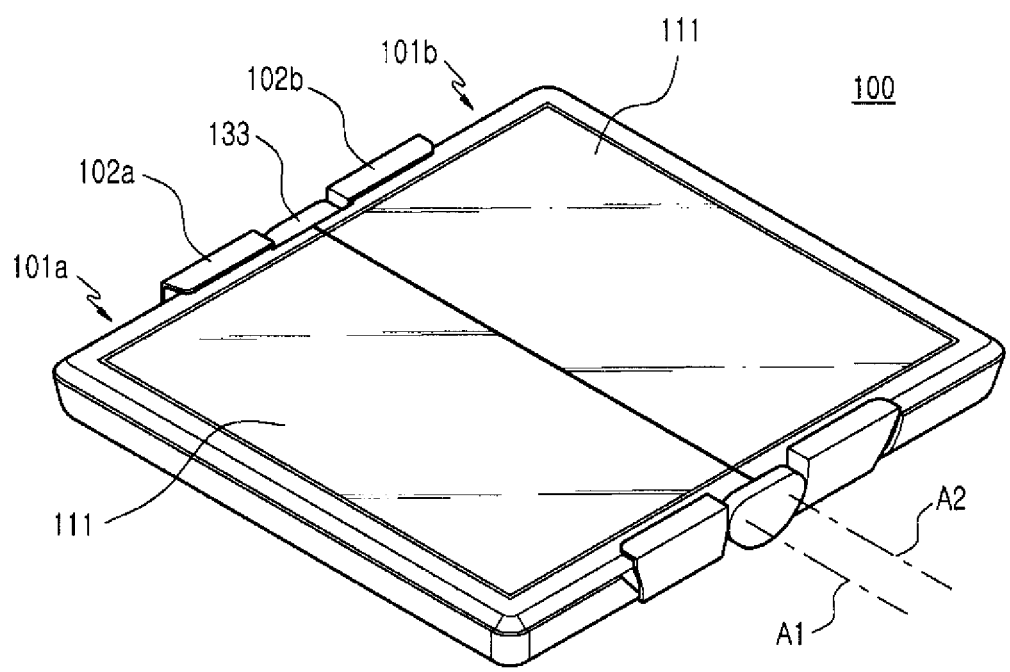
FIG. 2 is an assembled perspective view of the portable terminal illustrated in FIG. 1.
Figure 3:
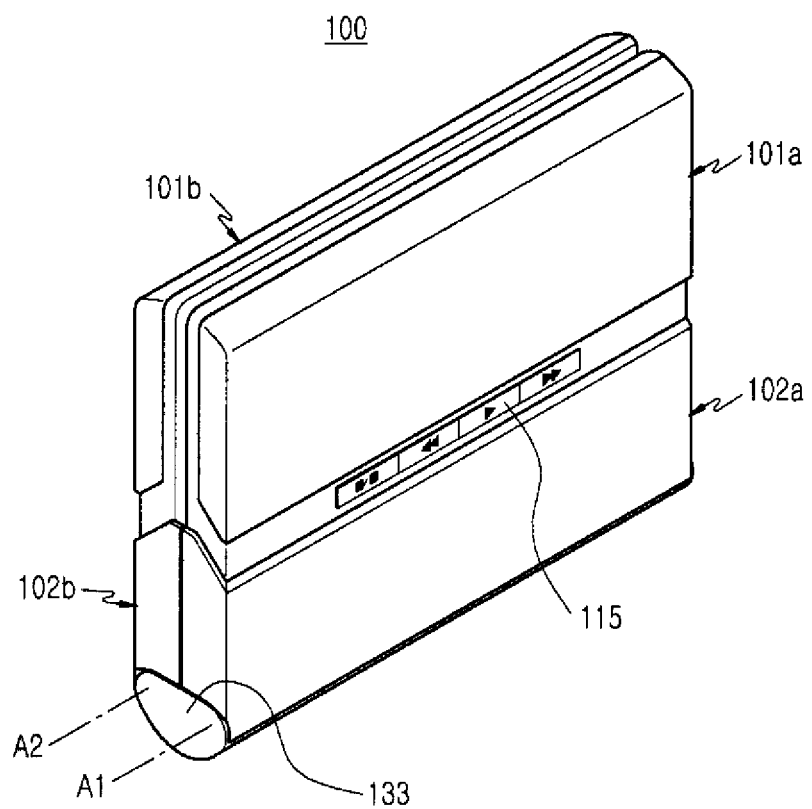
FIG. 3 is a perspective view of the portable terminal illustrated in FIG. 1 in a folded state.

FIG. 1 is an exploded perspective view of a portable terminal 100 according to an exemplary embodiment of the present invention, and FIGS. 2 and 3 are assembled perspective views of the portable terminal 100 in an open state and in a folded state, respectively.

Referring to FIGS. 1, 2 and 3, the portable terminal 100 according to an exemplary embodiment of the present invention includes a hinge device for providing a pair of parallel hinge axes A1 and A2, folding cases 102a and 102b each engaged with the hinge device, for rotating upon one of the hinge axes A1 and A2, and a sliding housings 101a and 101b slidably engaged with the folding cases 102a and 102b. When one of the folding cases 102a and 102b rotates, the other folding case also rotates via the hinge device.

Meanwhile, the sliding housings 101a and 101b rotate along with the folding cases 102a and 102b, while a corner of the sliding housing 101a becomes a close contact to a corner of the sliding housing 101b. While they are rotating with their corners close to each other, the sliding housings 101a and 101b move linearly with respect to the folding cases 102a and 102b. This operation of the portable terminal 100 will be described in more detail later with reference to FIGS. 4 to 9.

The following description will be made with the appreciation that the sliding housings 101a and 101b are configured to be symmetrical to each other, and the folding cases 102a and 102b are configured to be symmetrical to each other. However, it will be clearly understood to those skilled in the art that many modifications can be made to the outward appearance of the portable terminal 100. For example, a small display may be provided on an outer surface of a first sliding housing, and a battery pack may be provided on an outer surface of a second sliding housing. If the display is implemented into a touch screen in the portable terminal 100, a stylus pen with which to manipulate the touch screen may be accommodated in one of the sliding housings 101a and 101b.

The hinge device is provided with a cover member 103 and a hinge module 104. The cover member 103 includes a cover portion 131 for covering side surfaces of the folding cases 102a and 102b and module installation portions 133 formed at both ends of the cover portion 121. The module installation portions 133 are provided to cover both end portions of a side portion of each of the folding cases 102a and 102b. The hinge module 104 functions to interconnect rotations of the folding cases 102a and 102b. The hinge module 104 is installed in the cover member 103, particularly on an inner surface of at least one of the module installation portions 133. That is, a hinge module 104 may be installed in each of the module installation portions 133, while the hinge module 104 is shown to be installed in one of the module installation portions 133 by way of example. A module groove 135 may be formed on the inner surface of each of the module installation portions 133, for installing the hinge module 104. Thus, the hinge module 104 may be accommodated in the module groove 135 of a module installation portion 133.

Figure 5:
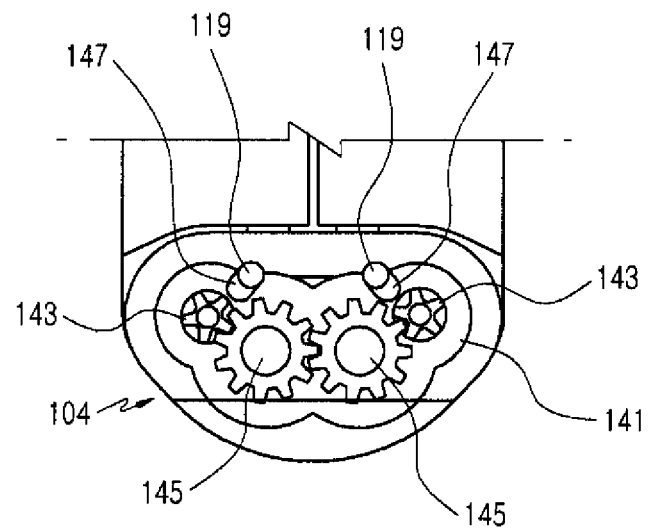
FIG. 5 is a schematic view illustrating the structure of a hinge device in the portable terminal illustrated in FIG. 4.

Referring to FIG. 5, the hinge module 104 includes a pair of first sun gears 143 apart from each other. The first sun gears 143 are arranged to rotate upon the hinge axes A1 and A2, respectively. For installation of the first sun gears 143, the hinge module 104 has an engagement plate 141. The folding cases 102a and 102b are actually interconnected by the first sun gears 143. Thus, when the first folding case rotates, the second folding case interacts with the first folding case and thus rotates symmetrically with the first folding case.

The first sun gears 143 should be installed such that they interact with each other and rotate in opposite directions in order to rotate the folding cases 102a and 102b symmetrically. Specifically, the first sun gears 143 may be installed to be in a direct mutual engagement relationship, a timing belt may be installed in the shape of '8', or a pair of second sun gears may be interposed between the first sun gears 143.

If the first sun gears 143 are in a direct mutual engagement arrangement, as the hinge axes A1 and A2 are farther from each other, the hinge device and eventually the portable terminal 100 get larger. This means that as the distance between the hinge axes A1 and A2 becomes greater, the diameter of the first sun gears 143 becomes larger and thus the hinge device becomes inevitably larger. Although the distance between the hinge axes A1 and A2 may be forced to be narrowed, the sizes of the folding cases 102a and 102b or the sizes of the sliding housings 101a and 101b are limited, as a result. Accordingly, considering the sizes of the folding cases 102a and 102b, the sliding housings 101a and 101b, and the hinge device, for securing sufficient room for parts, a hinge module with the first sun gears 143 in a direct mutual engagement with each other is not preferred.

As illustrated in FIG. 5, a pair of second sun gears 145 is interposed between the first sun gears 143 so that the first sun gears 143 may interact with each other. This configuration operates stably within a small space of the hinge device and facilitates a reduction of the diameter of the second sun gears 145 as well as the diameter of the first sun gears 143. Therefore, the hinge device can be made small.

Accordingly, an exemplary embodiment of the present invention will be described in the context of installing the second sun gear s 145 between the first sun gears 143. Yet, it may be also contemplated that the first sun gears 143 are installed to be directly engaged with each other, or the first sun gears 143 are made interact with each other by use of a timing belt.

In FIG. 5, the first sun gears 143 are installed on the engagement plate 141 such that they can rotate upon the hinge axes A1 and A2, respectively, apart from each other. The pair of second sun gears 145 interposed between the first sun gears 143 make the first sun gears 143 interact with each other. Meanwhile, a pair of guide grooves 147 is formed on the engagement plate 141 by partially cutting the engagement plate 141, for engaging with guide protrusions 119 formed on the sliding housings 101a and 101b. As a guide protrusion 119 is engaged with one of the guide grooves 147, the sliding housings 101a and 101b can slide in engagement with the folding cases 102a and 102b, without deviating from the folding cases 102a and 102b.

The folding cases 102a and 102b are engaged with the hinge device so that each of them may rotate upon one of the hinge axes A1 and A2. That is, each of the folding cases 102a and 102b is fixed to one of the first sun gears 143. Each of the folding cases 102a and 102b is shaped to cover parts of an outer surface and both side surfaces of the sliding housing 101a or 101b. The folding cases 102a and 102b each have at least one sliding protrusion 121 on their inner surface.

The sliding housings 101a and 101b are engaged slidably with the folding cases 102a and 102b. When the folding cases 102a and 102b rotate, the sliding housings 101a and 101b rotate to be folded to each other or to recede from each other, along with the folding cases 102a and 102b. During rotation along with the folding cases 102a and 102b, the sliding housings 101a and 101b are kept in contact at their corners, one corner per sliding housing. It is preferred that the corners of the sliding housings 101a and 101b are in contact irrespective of whether the sliding housings 101a and 101b rotate, which should not be construed as limiting the present invention. However, the corners or both ends of the sliding housings 101a and 101b should be brought into a contact when the sliding housings 101a and 101b are opened to 180°.

A display 111 is provided on an inner surface of each sliding housing 101a or 101b. One of four corners of the display 111 is aligned with a corner of the sliding housing 101a or 101b. The corners of the sliding housings 101a and 101b that are kept in contact irrespective of their rotation are aligned with the corners of the displays 111. Therefore, the portable terminal 100 has the two displays 111 such that when the sliding housings 101a and 101b are opened, a single display twice as large as one display 111 is available. That is, even when the sliding housings 101a and 101b are opened, the corners of the displays 111 are in contact, thus defining a larger display. Eventually the portable terminal 100 has an expended display by realizing one half of the display with the display 111 installed on the sliding housing 101a and the other half of the display with the display 111 installed on the sliding housing 102a.

Engagement portions 113 are formed by making parts of the outer surfaces of the sliding housings 101a and 101b lower than the other parts. When the sliding housings 101a and 101b are engaged with the folding cases 102a and 101b, the engagement portions 113 are slidably inserted into the folding cases 102a and 102b. The difference between the heights of the engagement portions 113 and the other parts of the sliding housings 101a and 101b corresponds to the thickness of the folding cases 102a and 102b. That is, when the folding cases 102a and 102 are installed to the sliding housings 101a and 101a, the outer surfaces of the folding cases 102a and 102 are even or flushed with the outer surfaces of the sliding housings 101a and 101b.

While not shown, sliding grooves are formed in the outer surfaces of the sliding housings 101a and 101b, particularly into the outer surfaces of the engagement portions 113. The sliding grooves are extended along a sliding direction of the sliding housings 101a and 101b. When the sliding housings 101 and 101b are engaged with the folding cases 102a and 102b, the sliding protrusions 121 fit into the sliding grooves. Therefore, the sliding housings 101a and 101b can slide on the folding cases 102a and 102b with a guidance of the sliding protrusions 121 and the sliding grooves.

The afore-described guide protrusions 119 are formed on both ends of one side of each of the sliding housings 101a and 101b, for engaging with the guide grooves 147 of the engagement plate 141. When the folding cases 102a and 102b rotate, the guide protrusions 119 move in predetermined trajectories. The guide grooves 147 are formed according to the trajectories of the guide protrusions 119. Therefore, the sliding housings 101a and 101b are prevented from sliding to an arbitrary position with respect to the folding cases 102a and 102b. That is, the guide grooves 147 and the guide protrusions 119 are engaged at positions that are determined according to the rotation angle of the folding cases 102a and 102b.

Referring back to FIG. 3, keys 115 or other input means may be installed on the outer surfaces of the sliding housings 101a and 101b. The keys 115 may operate even when the sliding housings 101a and 101b are folded or opened. A user may play a music file using the keys 115. The keys 115 may be installed in the engagement portions 113 so that the keys 115 may be opened or closed by the folding cases 102a and 102b. Since the sliding housings 101a and 101b slide with respect to the folding cases 102a and 102b, the outer surfaces of the sliding housings 101a and 101b are partially opened or closed by the folding cases 102a and 102b. Therefore, the keys 115 may be installed in an area opened or closed by the folding cases 102a and 102b.

Figure 4:
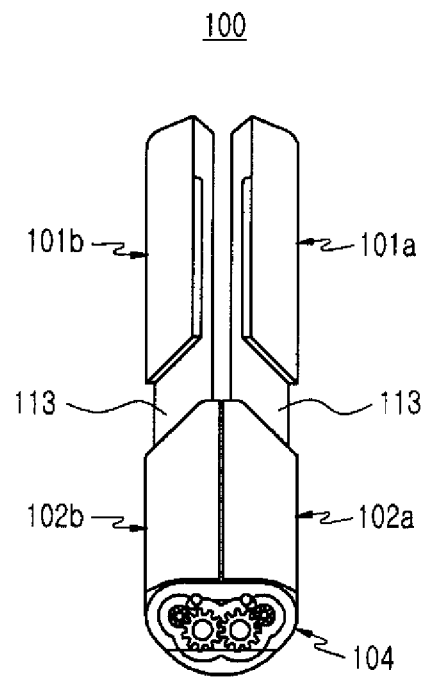
FIG. 4 is a side view of the portable terminal illustrated in FIG. 3.
Figure 8:
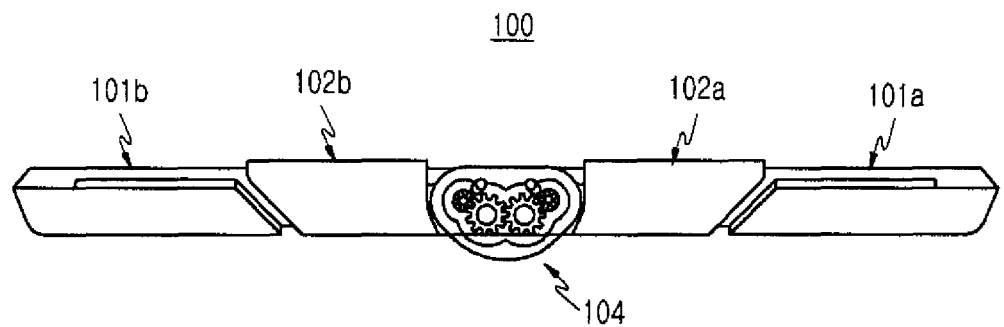
FIG. 8 is a side view of the portable terminal illustrated in FIG. 3 when the portable terminal is opened at 180°.

In comparison between FIG. 4 illustrating folding state of the sliding housings 101a and 101b and FIG. 8 illustrating unfolding (open) state of the sliding housings 101a and 101b, it is noted that when the sliding housings 101a and 101b are unfolded, a portion of the outer surfaces of the sliding housings 101a and 101b are closed by the folding cases 102a and 102b but the portion of the outer surfaces of the sliding housings 101a and 101b are opened by the folding cases 102a and 102b when they are folded. The keys 115 are installed in the portion of the outer surfaces of the sliding housings 101a and 101b being opened or closed by the folding cases 102a and 102b. Hence, the keys 115 may be instated such that they are exposed for operation when the sliding housings 101a and 101b are folded but covered or hidden by the folding cases 102a and 102b when the sliding housings 101a and 101b are unfolded or opened.

Figure 6:
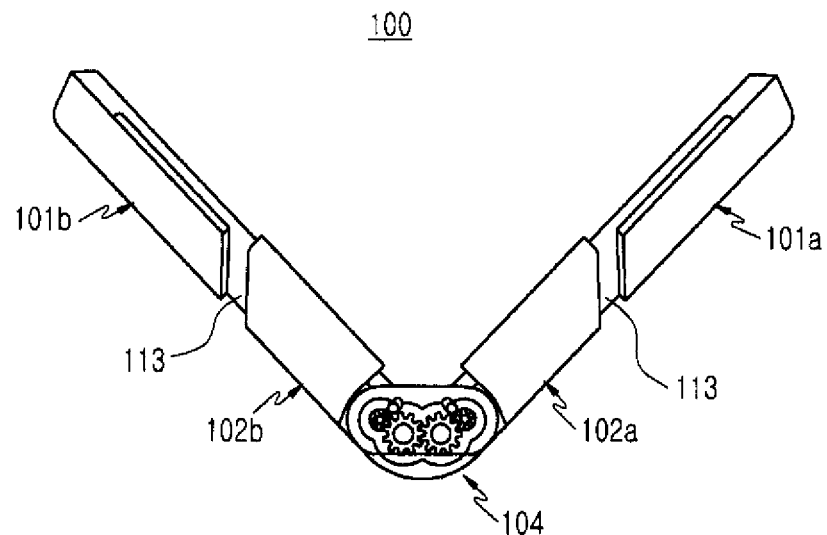
FIG. 6 is a side view of the portable terminal illustrated in FIG. 3 when the portable terminal is opened at 90°.
Figure 7:
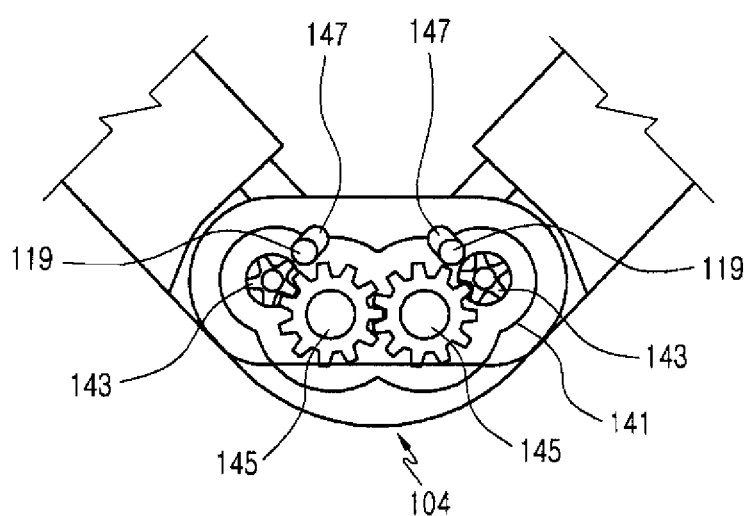
FIG. 7 is a schematic view illustrating the structure of the hinge device in the portable terminal illustrated in FIG. 6.
Figure 9:
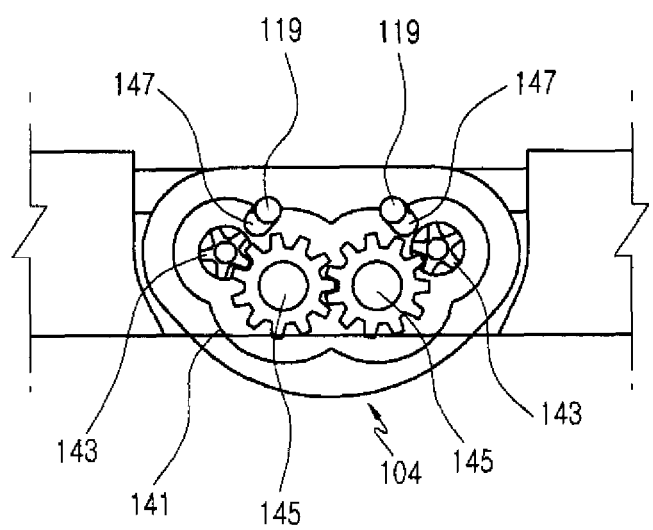
FIG. 9 is a schematic view illustrating the structure of the hinge device in the portable terminal illustrated in FIG. 8.

FIG. 4 is a side view of the portable terminal 100 illustrated in FIG. 3, FIG. 5 is a schematic view illustrating the structure of the hinge device in the portable terminal 100 illustrated in FIG. 4, FIGS. 6 and 7 illustrate the portable terminal 100 opened at 90°, and FIGS. 8 and 9 illustrate the portable terminal opened at 180°. It is noted from FIGS. 4 to 9, when the portable terminal 100 is opened from a folded state, the outer surfaces of the sliding housings 101a and 101b, particularly the outer surfaces of the engagement portions 113 are gradually covered by the folding cases 102a and 102b. For example, when the sliding housings 101a and 101b are folded, the engagement portions 113 are opened or exposed by about 5 mm. When the sliding housings 101a and 101b are unfolded, the engagement portions 113 are opened or exposed by about 1 mm.

Referring to FIGS. 4 and 5, when the sliding housings 101a and 101b are folded, the guide protrusions 119 are positioned at most outermost location of the guide grooves 147. The guide grooves 146 are extended toward the centers of the first sun gears 143 near to an outer edge of the engagement plate 141, that is, toward the hinge axes A1 and A2. Since the guide grooves 147 are formed according to the trajectories of the guide protrusions 119 that move along with the rotation of the sliding housings 101a and 101b, the shapes or extended directions of the guide grooves 147 may be changed according to the positions of the guide protrusions 119.

Referring to FIGS. 6 and 7, when the sliding housings 101a and 101b rotate and thus are opened at 90°, the guide protrusions 119 move inward in the guide grooves 147, that is, toward their nearby hinge axes A1 and A2.

Referring to FIGS. 8 and 9, when the sliding housings 101a and 101b further rotate and thus are opened at 180°, the guide protrusions 119 return outward in the guide grooves 147. The positions of the guide protrusions 119 are limited to certain points of the guide grooves 147 depending on the rotation positions of the sliding housings 101a and 101b. Hence, the sliding housings 101a and 101b may be installed not to deviate from the folding cases 102a and 102b. In addition, during the rotation of the sliding housings 101a and 101b, the displays 111 may be kept in contact at their one corners by the configuration of the guide protrusions 119 and the guide grooves 147.

Although it is preferred that the slide housing 101a and 101b, particularly the displays 111 are in a close contact relationship with each other, in alternate embodiment, it is possible to have only one display instead of two supported by the respective slide housing.

Further, one of the purposes of the present invention is to allow a user to conveniently use a multimedia service by providing a display of a sufficient size. Therefore, the present invention is intended to expand a display by configuring a pair of foldable housings so that the housings contact with each other at corners, one from each when they are opened at 180° and thus displays provided on the respective housings are connected with each other. Therefore, the displays 111 may be brought into close contact when the sliding housings 101a and 101b are opened at 180° without the need for being kept in close contact with each other during rotation of the sliding housings 101a and 101b.

As is apparent from the above description, the portable terminal of the present invention is configured such that the displays installed in the respective sliding housings are combined to yield a single display. As a result, the portable terminal is provided with an expanded display area. Even when the sliding housings are opened, the displays are kept in close contact at both ends of the sliding housings. Hence, the difference between the two displays can be unnoticeable. Alternatively, when the displays are operated independently, a multitasking function can be performed conveniently. Further, the portable terminal can play a music file or the like conveniently without being opened by installing hot keys in an area that is opened and closed via action of the folding cases.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A portable terminal comprising: a hinge device for providing a pair of hinge axes extended in parallel; a pair of folding cases engaged with the hinge device, for rotating upon one hinge axis of the hinge axes, respectively; and a pair of sliding housings slidably installed in the respective folding cases; wherein the folding cases rotate in a folding direction or in an unfolding direction via the hinge device, and wherein as the folding cases rotate, the sliding housings slide on the folding cases and when the sliding housings are opened at 180° with respect to each other, one end of the sliding housing is in contact with another end of the other sliding housing, and wherein the hinge device comprises a cover member including a cover portion for covering one surface of each of the folding cases in a folded state, and module installation portions formed at both ends of the cover portion for covering both side ends of the folding cases; and a hinge module installed on at least one of the module installation portions, and wherein the hinge module comprises: a pair of first sun gears arranged upon the hinge axes, respectively; and a pair of second sun gears arranged between the first sun gears for enabling the first sun gears interact with each other.

2. The portable terminal of claim 1, wherein the hinge module further comprises: an engagement plate for allowing the first sun gears to be rotatably engaged therewith; and a pair of guide grooves formed by partially cutting the engagement plate and guide protrusions formed at least one ends of the sliding housings, wherein the guide protrusions are engaged with the guide grooves and when the sliding housings rotate about each of the hinge axes with the folding cases, respectively, the guide protrusions move along an extended direction of the guide grooves.

3. The portable terminal according to claim 1, further comprises a module groove formed on an inner surface of the module installation portion, wherein the hinge module accommodated in the module groove.

4. The portable terminal according to claim 1, further comprising a display provided in each of the sliding housings, wherein the displays are kept in contact at the corners of the sliding housings.

5. The portable terminal according to claim 4, wherein the display provided in each of the sliding housing operates independently.

6. The portable terminal according to claim 1, further comprising keys installed on outer surfaces of the sliding housings, wherein when the folding cases and the sliding housings rotate, the keys are exposed or hidden by one of the folding cases.

7. The portable terminal according to claim 6, wherein each of the sliding housings comprises an engagement portion formed by making a part of an outer surface of the sliding housing lower than the other parts of the outer surface of the sliding housing and the engagement portions are accommodated in the folding cases.

8. The portable terminal according to claim 7, wherein the keys are installed on surfaces of the engagement portions.

9. The portable terminal according to claim 7, wherein when the sliding housings are combined with the folding cases, outer surfaces of the other parts of the sliding housings except for the engagement portions are even with outer surfaces of the folding cases.

10. The portable terminal according to claim 7, further comprising:
   at least one sliding groove formed into the surface of each of the engagement portions, extending along a sliding direction of the sliding housings; and
   a sliding protrusion formed on an inner surface of each of the folding cases,
   wherein when the sliding housings are engaged with the folding cases, the sliding protrusions guide sliding of the sliding housings, in engagement in the sliding grooves.

11. The portable terminal according to claim 1, further comprising keys installed on outer surfaces of the sliding housings, wherein when the folding cases and the sliding housings are folded, the keys are opened, and when the folding cases and the sliding housings are unfolded, the keys are closed.

12. The portable terminal according to claim 11, wherein each of the sliding housings comprises an engagement portion formed by making a part of an outer surface of the sliding housing lower than the other parts of the outer surface of the sliding housing and the engagement portions are accommodated in the folding cases.

13. A portable terminal comprising: a hinge device for providing a pair of hinge axes extended in parallel; a pair of folding cases engaged with the hinge device, for rotating upon one hinge axis of the hinge axes, respectively; and a pair of sliding housings slidably installed in the respective folding cases; keys installed on outer surfaces of the sliding housings, wherein when the folding cases and the sliding housings are folded, the keys are opened, and when the folding cases and the sliding housings are unfolded, the keys are closed, and wherein the folding cases rotate in a folding direction or in an unfolding direction via the hinge device, and wherein as the folding cases rotate, the sliding housings slide on the folding cases and when the sliding housings are opened at 180° with respect to each other, one end of the sliding housing is in contact with another end of the other sliding housing.

* * * * *